US008657131B2

(12) United States Patent
Pixler

(10) Patent No.: US 8,657,131 B2
(45) Date of Patent: Feb. 25, 2014

(54) EXPANDABLE FRAMEWORK WITH ATTACHABLE PLANT-SUPPORT TRAYS INSTALLABLE WITHIN AN INTERIOR WINDOW FRAME

(76) Inventor: William Scott Pixler, Springville, UT (US)

( * ) Notice: Subject to any disclaimer, the term of this patent is extended or adjusted under 35 U.S.C. 154(b) by 0 days.

(21) Appl. No.: 13/594,775

(22) Filed: Aug. 24, 2012

(65) Prior Publication Data

US 2013/0048586 A1 Feb. 28, 2013

Related U.S. Application Data

(60) Provisional application No. 61/527,109, filed on Aug. 24, 2011.

(51) Int. Cl.
*A01G 9/02* (2006.01)
*E06B 7/28* (2006.01)

(52) U.S. Cl.
USPC ................................ 211/123; 47/68; 248/208

(58) Field of Classification Search
USPC ................ 211/85, 85.3, 89.01, 90.01, 90.02, 211/90.04, 94.01, 105.1, 105.2, 105.3, 211/105.4, 105.5, 105.6, 106.01, 123, 124, 211/153, 175, 201, 204, 206; 108/42, 44, 108/136, 137, 147.21; 248/200.1, 202.1, 248/208, 236, 241, 250, 287.1, 295.11, 248/298.1, 558; 312/205; 47/67, 68
See application file for complete search history.

(56) References Cited

U.S. PATENT DOCUMENTS

| | | | | | |
|---|---|---|---|---|---|
| 564,272 | A | * | 7/1896 | Cooper | 248/217.2 |
| 961,352 | A | * | 6/1910 | Walters | 211/105.6 |
| 1,229,073 | A | * | 6/1917 | Harris | 248/236 |
| 1,261,513 | A | * | 4/1918 | Green | 248/208 |
| 1,639,551 | A | * | 8/1927 | Booth | 211/105.6 |
| 1,733,485 | A | * | 10/1929 | Elzear Desrosiers | 211/94.03 |
| 3,946,522 | A | | 3/1976 | Schifman | |
| 4,118,087 | A | * | 10/1978 | Dorf | 312/291 |
| 4,195,577 | A | * | 4/1980 | Gross | 108/31 |
| 4,748,770 | A | * | 6/1988 | Cline | 47/68 |
| D334,636 | S | | 4/1993 | Honeycutt | |
| 5,857,577 | A | * | 1/1999 | Thomas et al. | 211/94.01 |
| 6,367,750 | B1 | * | 4/2002 | Ford | 248/208 |
| 8,132,366 | B1 | * | 3/2012 | LeBlanc | 47/67 |
| 8,408,404 | B2 | * | 4/2013 | Miller et al. | 211/90.01 |
| 2007/0245625 | A1 | | 10/2007 | Lennon | |
| 2012/0261371 | A1 | * | 10/2012 | Baines | 211/123 |

* cited by examiner

*Primary Examiner* — Joshua Rodden
(74) *Attorney, Agent, or Firm* — Angus C. Fox, III

(57) ABSTRACT

An expandable framework, with attachable plant-support trays, is provided for installation within an interior window frame. One embodiment of the framework is expandable to a fixable height in a vertical direction and expandable in a horizontal direction via upper and lower telescoping tube pairs to accommodate a range of common window sizes. A pair of spacer sticks are provided, which can be cut to appropriate lengths so that one spacer stick and an associated coil spring can be inserted within each telescoping tube pair so that the frame assembly can be biased against opposed vertical portions of the window frame in the interior of a building. A plurality of tray support arms, each of which has a square aperture or receptacle, can be rotationally locked onto each telescoping tube pair for the support of a plant support tray.

14 Claims, 10 Drawing Sheets

100
101

800
102
700

602
600
601
604
103
102

603

200
201
103

300
400

502
501
500

EXPANDABLE FRAMEWORK WITH ATTACHABLE PLANT-SUPPORT TRAYS INSTALLABLE WITHIN AN INTERIOR WINDOW FRAME

This application has a priority date of Aug. 24, 2011 based on the filing, by the same inventor, of Provisional Patent Application No. 61/527,109, titled EXPANDABLE FRAMEWORK WITH ATTACHABLE PLANT-SUPPORT TRAYS INSTALLABLE WITHIN AN INTERIOR WINDOW FRAME.

BACKGROUND OF THE INVENTION

1. Field of the Invention

This invention relates generally to flower box support structures and, more particularly, to expandable structures, operatively associated with interior window frames, that are coupled to trays designed to hold potted plants.

2. History of the Prior Art

For many centuries, flowering plants located in planters outside of windows have decorated homes throughout the world. In many locations, seasonal freezing temperatures kill the plants and put an end to the display of color. In colder regions, where harsh winter climates limit growth of flowering plants to spring, summer and early fall, the raising of potted plants indoors has become a popular hobby. The interior of homes provides an ideal climate for tropical and semi-tropical plants, as the interior temperature is much like the climate of Hawaii, with a temperature range of 15-30° C. (59-86° F.). In some homes, the range of temperatures is even more closely controlled within a range of about 20-25° C. (68-77° C.). Thus, homes function very effectively as greenhouses if plants have access to sufficient sunlight. By placing potted plants near windows or artificial light sources, such as fluorescent light fixtures which are turned on a good portion of the day, plants can be tricked into behaving as though it is eternal summer.

The prior art discloses several inventions which provide sunlight to growing plants in an interior window environment.

U.S. Patent Publication No. 2007/0245625 A1, which was submitted by Christian Lennon, discloses a Window-Mounted Planter, which includes a container for holding plants, that is mounted on a window pane from attachment positions outside the periphery of the container's silhouette on the window. The container includes a planar surface that rests against the window. At least two mounting elements, such as suction cups, attach to the window. A flexible strand is used to secure an end of the container to each mounting element.

U.S. Pat. No. 4,748,770 to Joel S. Cline, discloses a window box planter in combination with a window assembly, including a window frame and a window sill, wherein the device comprises a receptacle unit and a securing rod assembly which extends through the receptacle unit. The securing rod assembly comprises a pair of cooperating cylindrical elements, which are urged apart by a spring, and which are provided on their outboard ends with friction pads, which operatively and releasably engage the device with the window frame.

U.S. Pat. No. 3,946,522 to Edward J. Schifman, discloses a greenhouse planter box attached to a window sill for growing houseplants. The box, which is attached to a window sill with an underlying support structure, is enclosed on all sides, except for the rear thereof, which is open and communicates with the interior of a room through a window opening. The box is equipped with vents and with a pull-out drawer, which provides easy access to the plants. A transparent cover admits sunlight into the box. Flexible baffle curtains are provided so that the entire window area through which the planter box extends may be closed off from the outside.

Other related art includes U.S. Pat. No. Des. 334,636 to Jerry P. Honneycutt, which discloses a Combined Domestic Bird Feeder and Planter for Window Sill, and also U.S. Pat. No. 4,048,754 to Leon E. Laux, which discloses a Window Box Planter With Tool-Free Quick Set-Up and Hanging Adjustment. The Laux device includes incrementally-adjustable plural hangers for potted plants, which are attached to a window sill with a wedge-tight spring-lock assembly-securance system. The potted plants remain outside the house and are exposed to the elements.

SUMMARY OF THE INVENTION

The present invention provides an expandable framework, with attachable plant-support trays, that is installable within an interior window frame. A first embodiment framework is expandable to a fixable height in a vertical direction and expandable in a horizontal direction via upper and lower telescoping tube pairs to accommodate a range of common window sizes. A pair of spacer sticks are provided, which can be cut to appropriate lengths so that one spacer stick and an associated coil spring can be inserted within each telescoping tube pair so that the frame assembly can be biased against opposed vertical portions of the window frame in the interior of a building. A plurality of tray support arms can be installed on each telescoping tube pair for the support of at least one potted plant support tray. The frame assembly provides for support of at least one potted plant support tray at a level near the bottom of the window frame and at least one other potted plant support tray at a higher level in the window. Each of the telescoping tube pairs is of rectangular cross section, and each of the tray support arms has a square receptacle that fits over its associated telescoping tube pair with minimum clearance so that it is rotationally locked about the telescoping tube pair. Sleeves are provided which slide into the receptacle of the tray support arm so that tray support arms of identical size can be used on both ends of each telescoping tube pair.

A second embodiment framework utilizes a pair of vertical frame components that are injection molded from thermoplastic resin. Each vertical frame component has a pair of square apertures, each of which receives one end of a square tube. The apertures in each component can be of different size to accommodate either the larger outer square tube or the smaller inner square tube. Alternatively, each aperture can be stepped so as to accommodate either size square tube. The smaller square tubes are more deeply seated within the aperture. The telescoping square tube pairs function much like those of the first embodiment framework. Rather than using sticks that can be cut to length for spring spacers, a plurality of spacers of different lengths are provided. Different combinations of spacers provide an appropriate total spacer length. Rather than employing tray support arms of the first embodiment framework, which are made from formed and spot welded sheet metal, the tray support arms of the second embodiment framework are laminar pieces cut or stamped from sheet metal. Sleeves are again provided so that the tray support arms can be installed on either the larger outer square tube or the smaller inner square tube. Alternatively, the tray support arms can be manufactured from thermoplastic resin using an injection molding process. Internal webbing can be provided so that the injection molded support arms are resistant to deformation and sagging.

DETAILED DISCLOSURE OF THE INVENTION

The invention will now be described in detail with reference to the attached drawing figures. It should be understood that the drawings are intended to be merely illustrative of the invention, and may not be drawn accurately to scale. FIGS. 1 through 12 depict a first embodiment of the invention. FIGS. 1 through 8 show all the individual components—other than screws and nuts—of the first embodiment expandable framework, with attachable plant-support trays, that is installable within an interior window frame. FIGS. 13 through 22 depict a second embodiment of the invention.

Figures 1, 2, 3, 4, 5, 6, 7, 8:
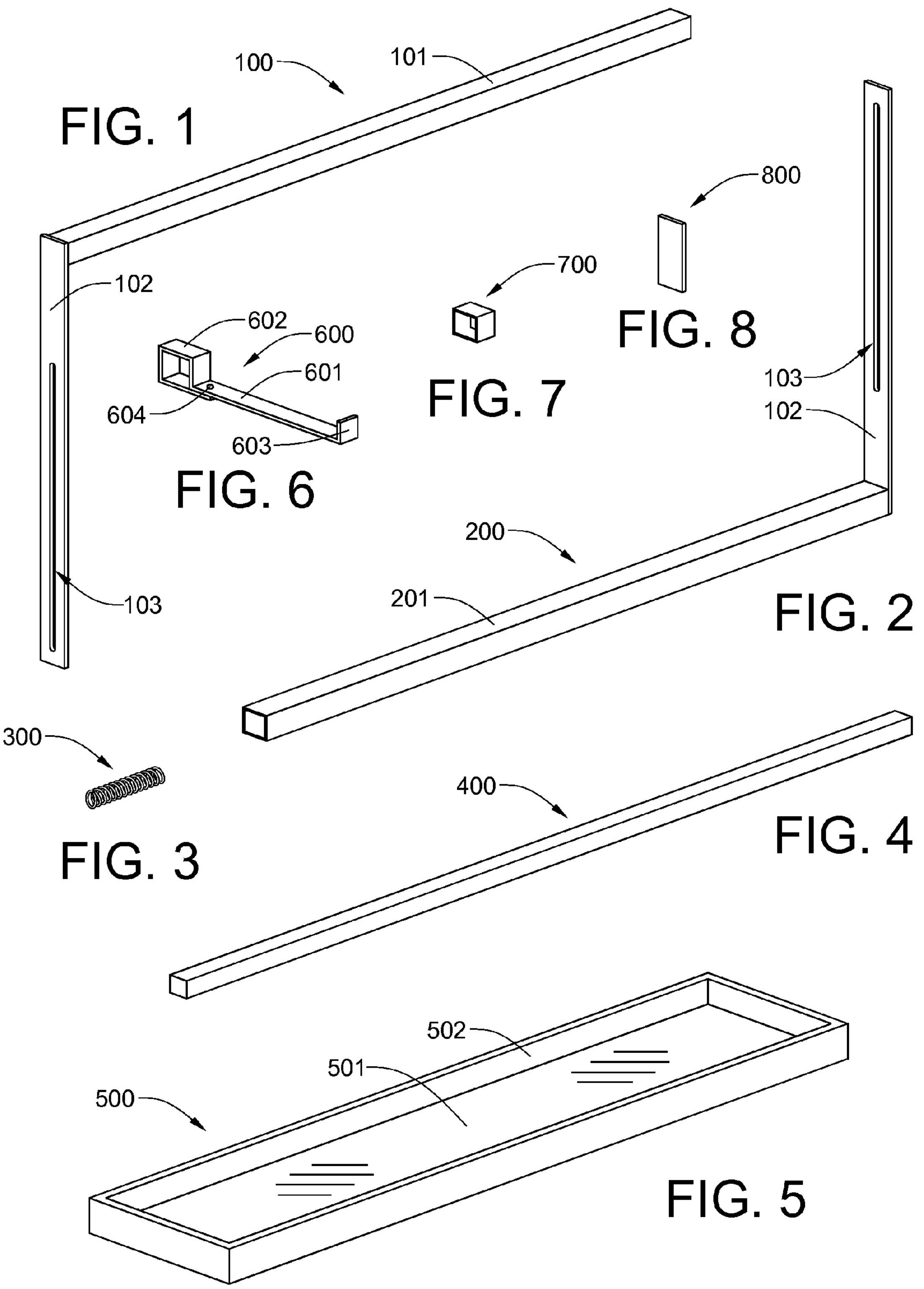
FIG. 1 is an isometric view of an inside telescoping tube and bracket assembly.
FIG. 2 is an isometric view of an outside telescoping tube and bracket assembly.
FIG. 3 is an isometric view of a coil biasing spring.
FIG. 4 is an isometric view of a cut-to-size spring backer stick.
FIG. 5 is an isometric view of a plant support tray.
FIG. 6 is an isometric view of a tray support bracket.
FIG. 7 is an isometric view of a tubular shim of square cross section.
FIG. 8 is an isometric view of a resilient backing pad.

Referring now to FIG. 1, an inside telescoping tube and bracket assembly 100 includes an inside square tube 101 and an adjustable bracket 102 which has a slot 103 for securing screws (not shown in this view). Two inside telescoping tube and bracket assemblies 100 are required for the expandable framework. The inside telescoping tube and bracket assembly 100 is preferably fabricated from a structural metal, such as mild steel, stainless steel, or aluminum.

Referring now to FIG. 2, an outside telescoping tube and bracket assembly 200 includes an outside square tube 201 and an adjustable bracket 102 which has a slot 103 for securing screws (not shown in this view). Two inside telescoping tube and bracket assemblies 200 are required for the expandable framework. The inside square tube 101 fits inside the outside square tube 201, with minimal clearance that still provides a non-interference fit, in a telescoping arrangement. The inside telescoping tube and bracket assembly 100 is preferably fabricated from a structural metal, such as mild steel, stainless steel, or aluminum.

Referring now to FIG. 3, a coil spring 300 has a diameter that enables it to slide freely within the inside telescoping tube 101.

Referring now to FIG. 4, a spring backer stick 400 can be cut to a length appropriate for loading the coil spring when the expandable framework is installed in an interior window frame.

Referring now to FIG. 5, a plant support tray 500 has a bottom panel 501 and a perimetric wall 502. The perimetric wall is preferably about 1.5-3.0 cm in height. The tray can be injection molded from structural polymeric (plastic) resins, such as polyvinylchloride (PV), polycarbonate (PC), acrylonitrile butadiene styrene (ABS), polypropylene (PP), high-density polyethylene (HDPE), polymer alloys, or fabricated or stamped from structural metals. The plant support tray 500 is watertight and designed to hold water that may drip from potted plants after they are watered.

Referring now to FIG. 6, a tray support bracket 600 is preferably formed from laminar metal strip stock using a stamping and bending process, followed by a spot-square welding operation. The bracket 600 is formed so that it has an extension arm 601, a rear receptacle 602 sized to slide freely over the outside square tube 201 with minimal clearance, and an upwardly-bent front tab 603. The dimple 604 is the spot weld that maintains the square rear receptacle 602 in a rigid shape.

Referring now to FIG. 7, a square tubular shim 700 is fabricated by cutting sections from the square-tube stock used to make the outside square tube 201. The shim 700 fits into the square rear receptacle 602 of the tray support bracket 600 so that the bracket 600 can slide freely over the inside square tube 101 and remain rotationally locked in place on the inside square tube 101.

Referring now to FIG. 8, one or more resilient backing pads 800 will be used to cushion the adjustable brackets 102 as they are urged against an interior window frame and prevent the expandable framework from sliding down, or otherwise moving within the window frame. The resilient backing pads 800 are made from natural or synthetic rubber or from a resilient plastic polymer.

Figures 9, 10:
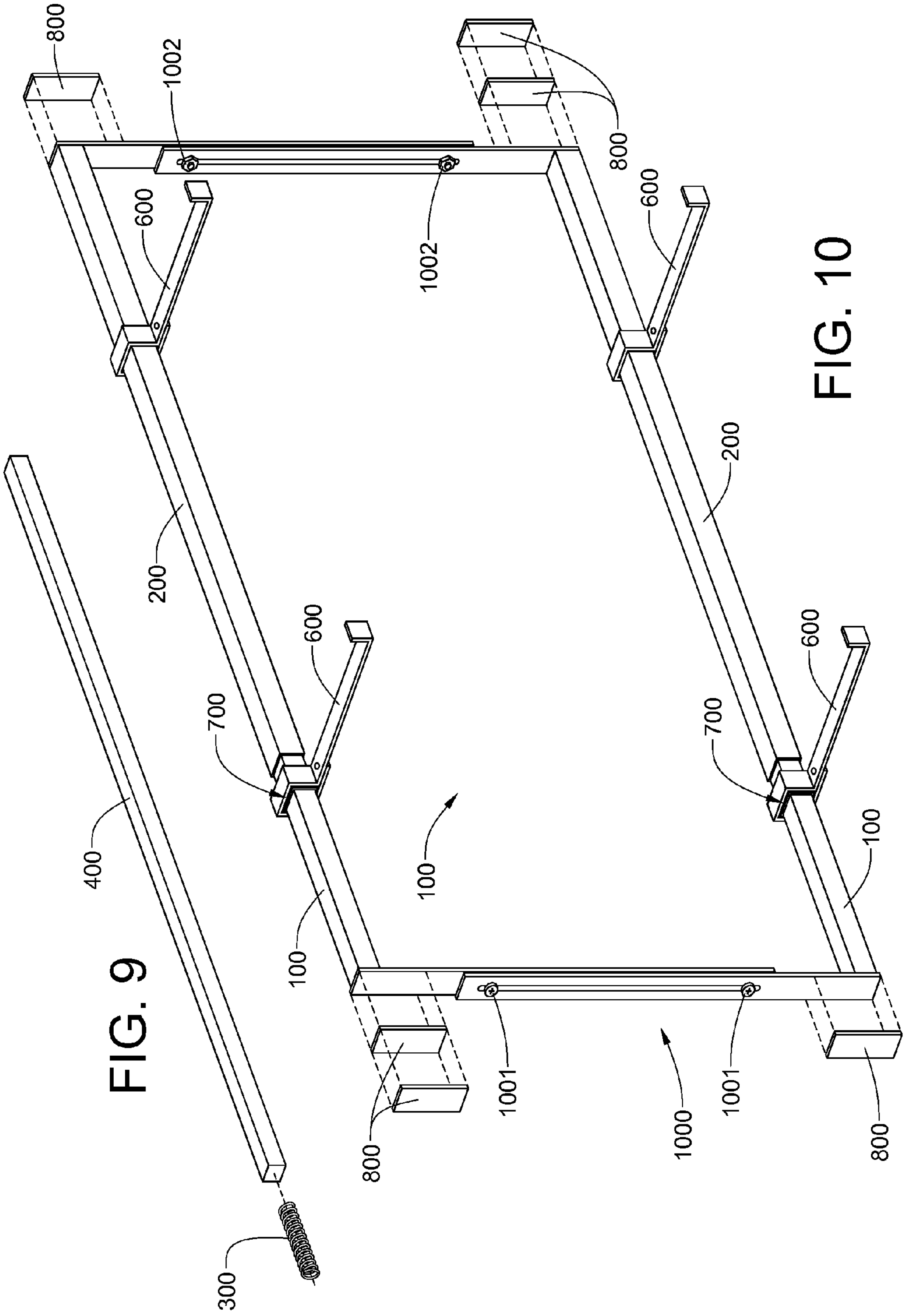
FIG. 9 is an isometric view of the coil biasing spring and spring backer stick.
FIG. 10 is an isometric view of an assembled expandable frame having tray support brackets installed thereon.

Referring now to FIG. 9, a coil spring 300 and spring backer stick 400 are shown together in axial alignment as they will be inserted into an inside square tube 101 and outside square tube 201 telescoping pair. When compressed to about fifty percent of its resting length, the coil spring 300 provides sufficient biasing force to maintain the expandable framework 1000 (see FIGS. 10, 11 and 12) locked in place within a window frame.

Referring now to FIG. 10, the expandable framework 1000 is shown fully assembled. Though the resilient backing pads 800 are shown in exploded format, they will be adhesively bonded to the expandable framework 1000 before installation in a window frame. Where two backing pads 800 are used, the outer pad will be adhesively bonded to the inner pad, which will be bonded to the framework 1000. Threaded fasteners (i.e., machine screws 1001 and nuts 1002) are used to secure together each pair of mated adjustable brackets 102.

Figure 11:
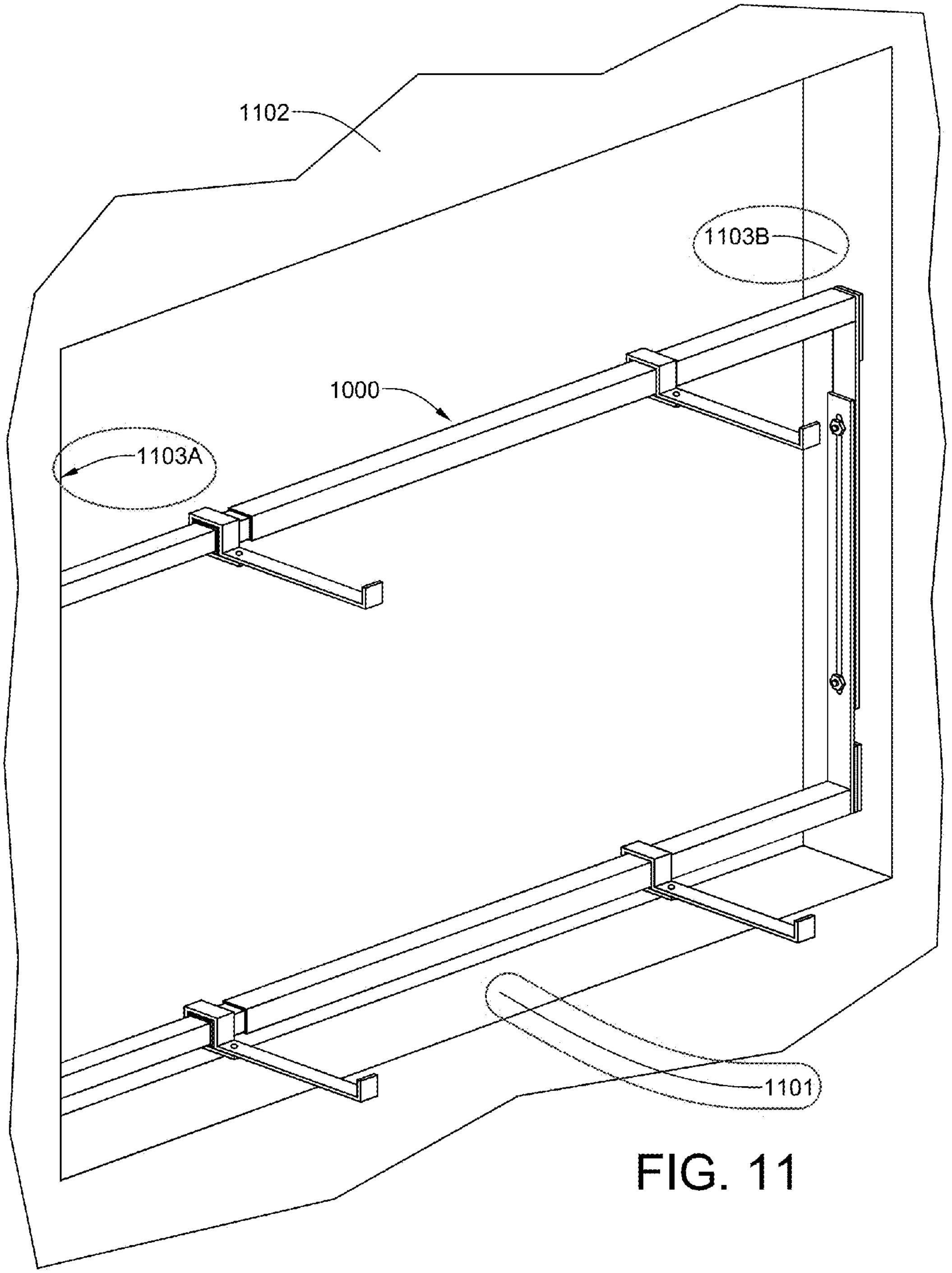
FIG. 11 is an isometric view of the assembled expandable frame and support brackets installed within a window frame.

Referring now to FIG. 11, the assembled expandable framework 1000 has been installed within a window frame 1101 set in a wall 1102 in the interior of a building. It will be noted that the resilient pads 800 provide a cushion between the framework 1000 and the opposed vertical sides 1103A and 1103B of the window frame 1101.

Figure 12:
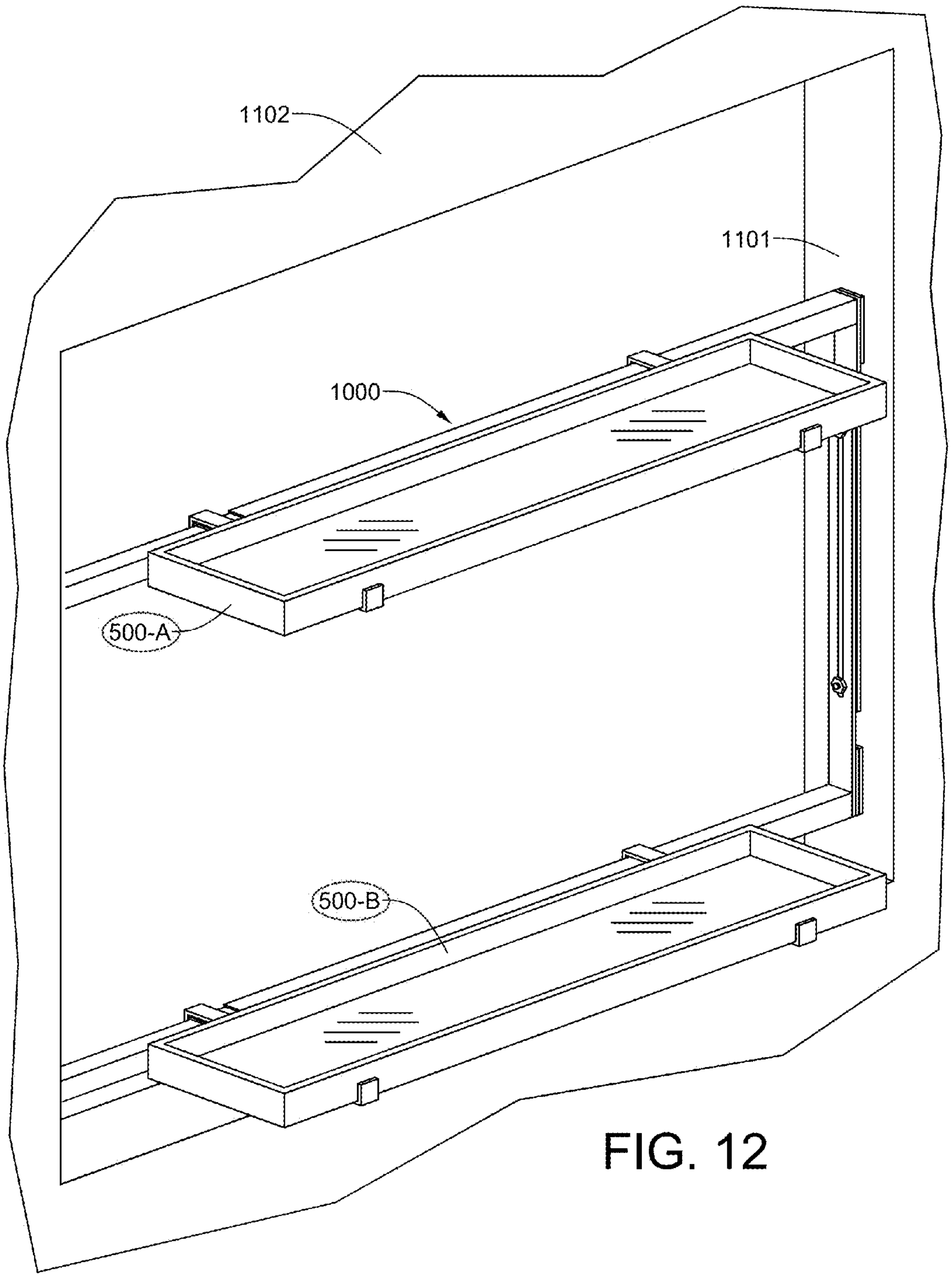
FIG. 12 is an isometric view of the assembled expandable frame, support brackets and a pair of potted plant support trays installed within a window frame.

Referring now to FIG. 12, a pair of plant support trays 500-A and 500-B have been installed on the tray support brackets 600, which are attached to the expandable framework 1000 that is installed in the window frame 1101.

Figure 13:
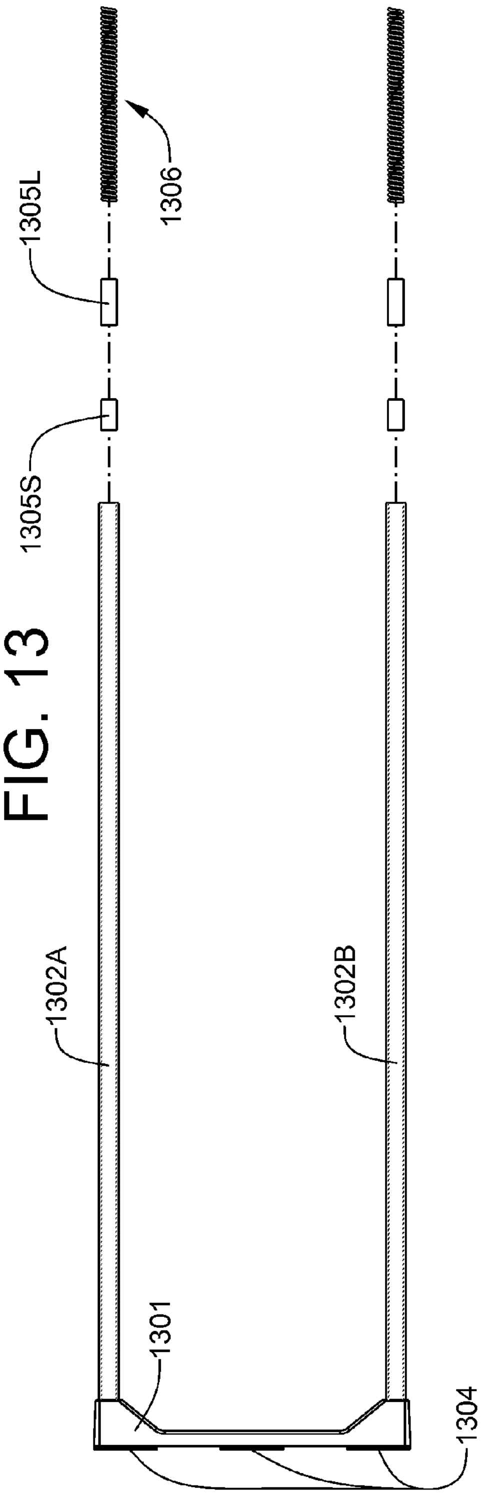
FIG. 13 is a front elevational view of a plain vertical frame component, two large square tubes, multiple spacers, and two compression springs.
Figure 14:
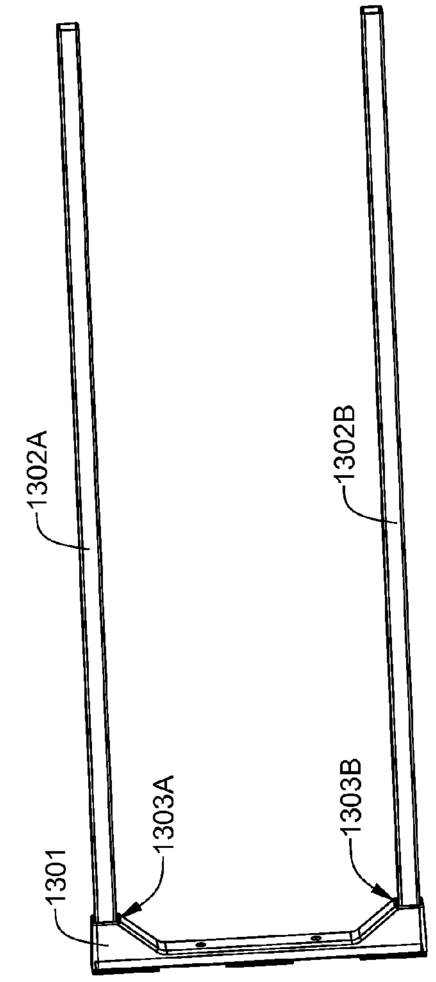
FIG. 14 is an isometric view of the plain vertical frame component.

Referring now to FIGS. 13 and 14, a plain vertical frame component 1301 is shown having two identical large square tubes 1302A and 1302B (generally 1302) installed in the square tube-receiving apertures 1303A and 1303B thereof. Three resilient pads 1304 have been adhesively adhered to the back of the plain vertical frame component 1301. A short spacer 1305S and a long spacer 1305L are shown aligned with a compression spring 1306. An appropriate number and size of spacers and the compression spring 1306 slide into each large square tube 1302 in order to provide a biasing effect against a telescoping smaller square tube that slides into the larger tube 1302.

Figure 15:
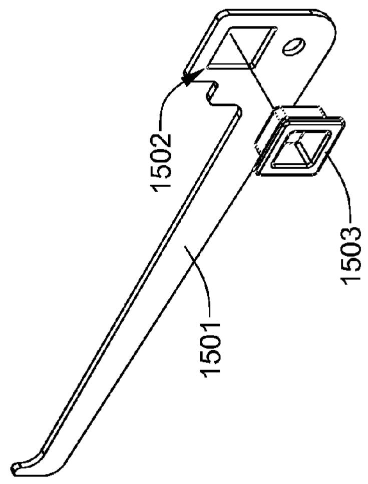
FIG. 15 is an isometric view of a laminar tray support arm and a sleeve.

Referring now to FIG. 15, a laminar tray support arm 1501 has a square aperture 1502 that is sized to slide over a large size square tube 1302 with minimal clearance so as to rotationally lock the tray support arm 1501 on the square tube 1302. When the sleeve 1503 is pressed into the square aperture 1502, the effective size of the aperture 1502 is reduced, thereby enabling the tray support arm 1501 to rotationally lock on a small size square tube, which telescoped within the large square tube 1302.

Figure 16:
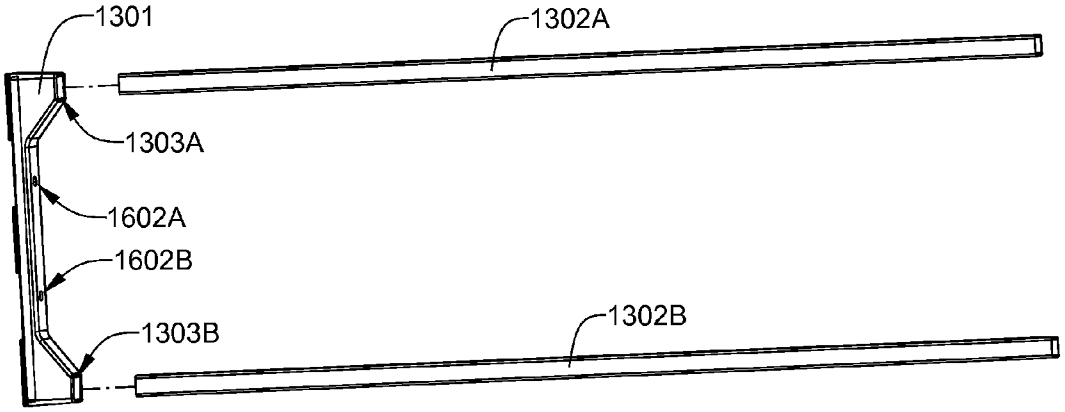
FIG. 16 is an isometric view of a plain vertical frame component and two large square tubes that are aligned for installation within the square apertures of the plain vertical frame component.

Referring now to FIG. 16, the plain Vertical frame component and square tubes of the assembly of FIG. 14 have been disassembled. In this view, the square tube-receiving apertures 1303A and 1303B are visible. Also visible in this view are two countersunk cylindrical apertures 1602A and 1602B, which enable the plain vertical frame component to be secured to a window frame with screws (not shown).

Figure 17:
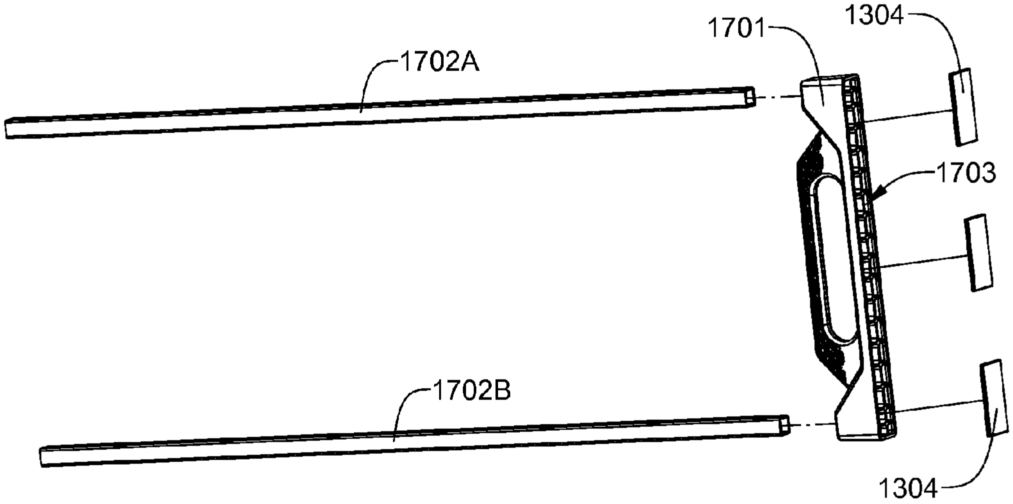
FIG. 17 is an isometric view of a handle-equipped vertical frame component, a pair of small square tubes aligned for installation within the square apertures of the handle-equipped vertical component; and three resilient pads which adhere to the back of each of the vertical frame components.

Referring now to FIG. 17, a handle-equipped vertical frame component 1701 is shown with a pair of small square tubes 1702A and 1702B that are aligned for installation within the square apertures of the handle-equipped vertical frame component 1701. Three resilient pads 1304, which adhere to the back of the handle-equipped vertical frame component, are also shown. It will be noted that the handle-equipped vertical frame component, which is preferably injection molded from a structural thermoplastic, is equipped with a gridwork of reinforcement ribs 1703. The plain vertical frame component 1301 is also preferably injection molded from a structural thermoplastic and, though not visible, is also preferably equipped with a gridwork of reinforcement ribs.

Figure 18:
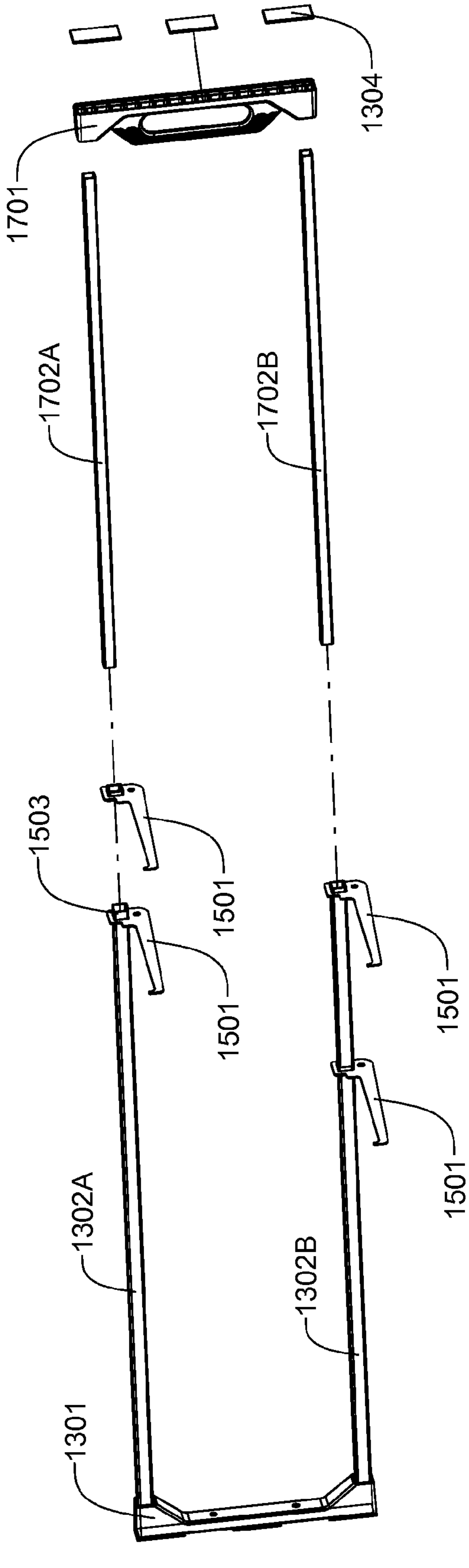
FIG. 18 is an isometric view of the assembly of FIG. 14, the assembly of FIG. 17, four tray support arms, and several sleeves that enable the tray support arms to rotationally lock onto the small square tubes.

Referring now to FIG. 18, the assemblies of both FIG. 14 and FIG. 17 are shown together, along with four tray support arms 1501 and several sleeves 1503 that enable the tray support arms 1501 to rotationally lock onto the small square tubes 1702A and 1702B.

Figure 19:
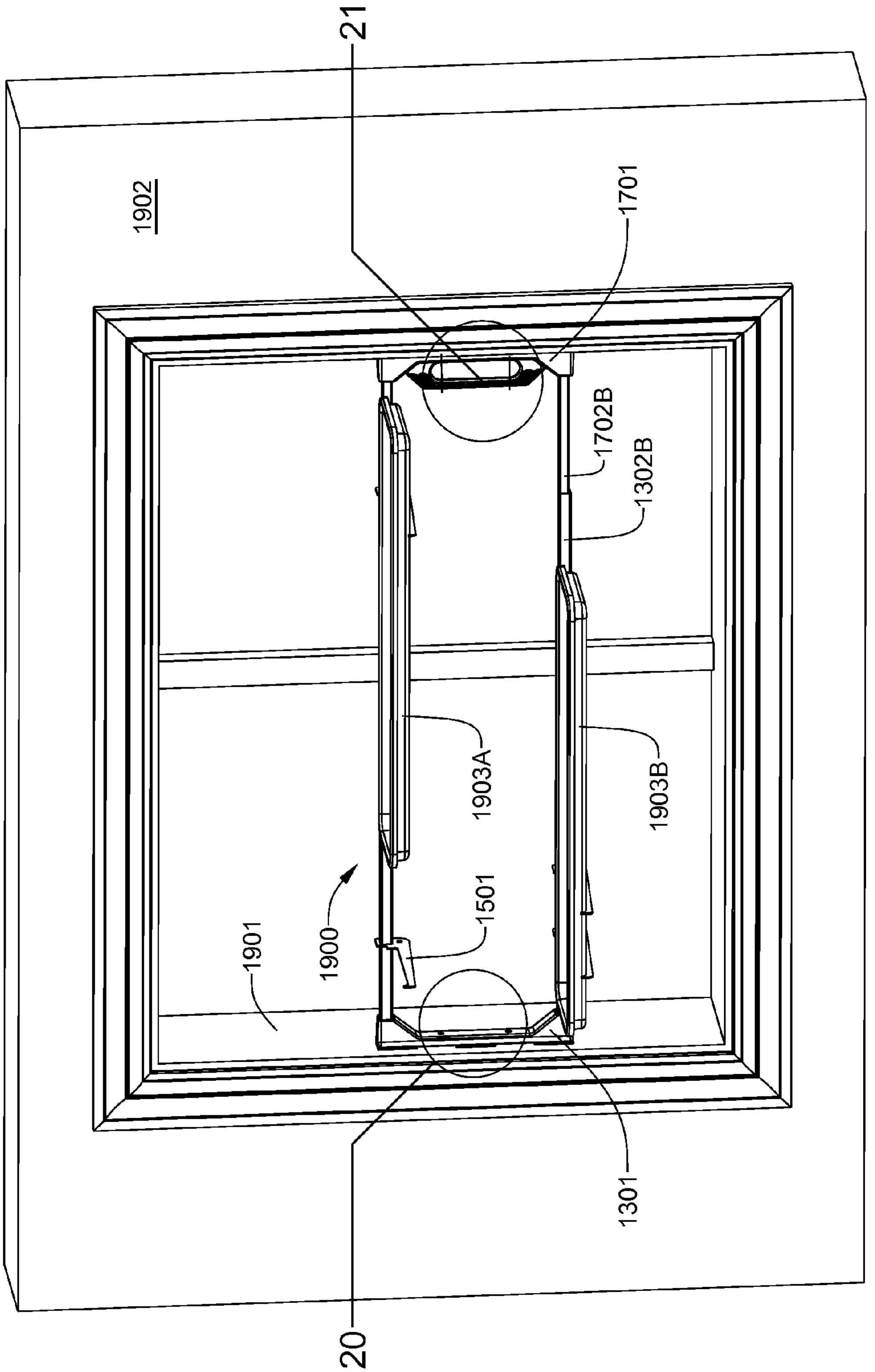
FIG. 19 is a first isometric view of the second embodiment framework and plant support trays installed within a window frame.

Referring now to FIG. 19, the components of FIG. 18 have been assembled so that the small square tubes 1702A and 1702B are telescopingly installed within the large square tubes 1302A and 1302B, respectively. The resulting second embodiment framework 1900 has been installed in an interior window frame 1901 that is set in a wall 1902. Plant support trays 1903A and 1903B are supported by the tray support arms 1501. It will be noted that, simply for the sake of illustration, one of the tray support arms on the top pair of telescoping tubes 1301A and 1702A has been slid to the left. In this configuration, it will, of course, not support the plant support tray 1903A.

Figure 20:
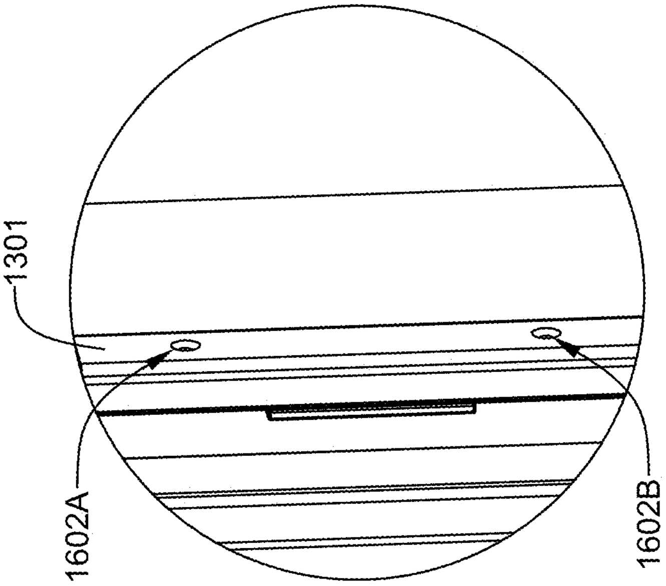
FIG. 20 is a close-up view of the circular area 20 of FIG. 19.

Referring now to FIG. 20, the circular area 20 of FIG. 19 has been blown up to show detail of the plain vertical frame component 1301. The countersunk cylindrical apertures 1602 and 1602B are plainly visible in this view. It should be noted that although not shown in the drawings, the handle-equipped vertical frame component 1701 is also equipped with a pair of countersunk cylindrical apertures, through which the handle-equipped vertical frame component 1701 can also be secured to the window frame.

Figure 21:
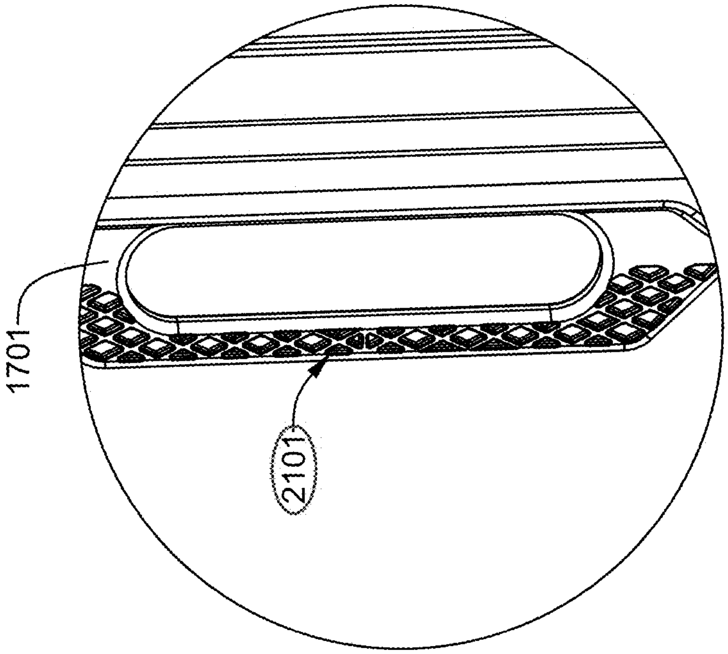
FIG. 21 is a close-up view of the circular area 21 of FIG. 19.

Referring now to FIG. 21, the circular area 21 of FIG. 19 has been blown up to show detail of the handle-equipped vertical frame component 1701. It will be noted that the handle portion is equipped with a framework of reinforcing, interlocking ribs 2101.

Figure 22:
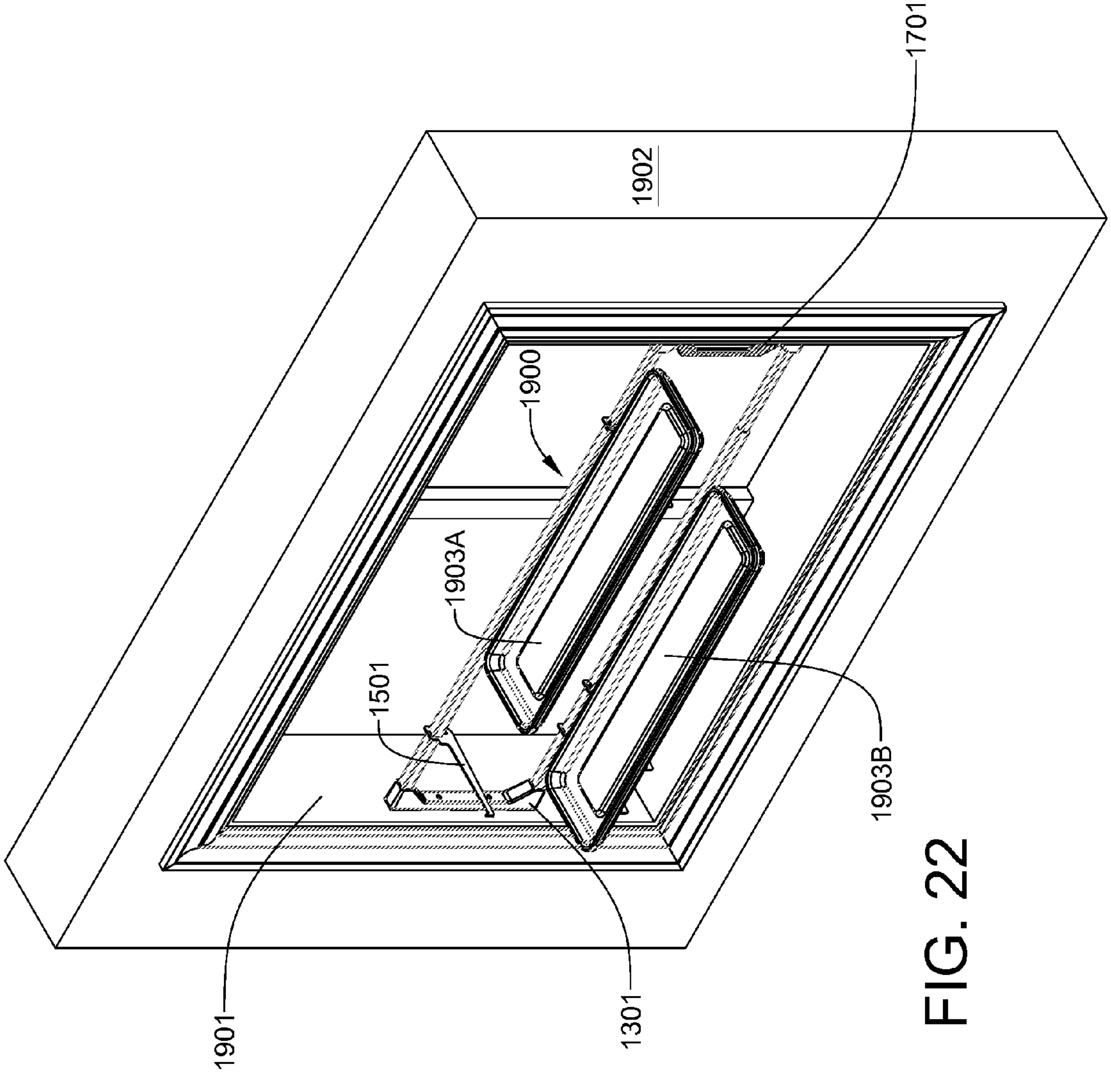
FIG. 22 is second isometric view of the second embodiment framework and plant support trays installed within a window frame.

Referring now to FIG. 22, the assembly of FIG. 19 is shown from a different angle. In this view, the plant support trays 1903A and 1903B are more visible. It will be noted that they can be offset from one another, thereby enabling large plants to be placed at the ends of the framework.

The primary differences between the first and second embodiments of the invention are that the second embodiment does not have vertical adjustability of the framework. However, it is simpler to assemble and install in a window frame. The second embodiment of the invention can also be packaged in a smaller box, as the vertical frame components are not permanently secured to the telescoping square tubes.

Although only a single embodiment of the expandable framework and support trays for supporting potted plants within a window frame within the interior of a building is disclosed herein, it will be obvious to those having ordinary skill in the art that changes and modifications may be made thereto without departing from the scope and spirit of the invention as may hereinafter be claimed.

What is claimed is:

1. A potted plant support structure for mounting within an interior window frame, said potted plant support structure comprising:

an expandable framework having spaced-apart vertical frame components interconnected by upper and lower horizontally telescoping tube pairs, each of said vertical frame components being injection molded from thermoplastic resin and having a pair of square apertures, each aperture being sized to receive one end of one of the telescoping tube pairs, said expandable framework being spring biasable against vertical sides of the interior window frame;

a plurality of tray support arms, each of which has a square aperture that rotationally locks to one of said upper and lower horizontally telescoping tube pairs; and a plurality of plant support trays which are restable on said tray support arms.

2. The potted plant support structure of claim 1, wherein at least one of said vertical frame components incorporates a handle, which facilitates installation of the expandable framework within the interior window frame.

3. A potted plant support structure for mounting within an interior window frame, said potted plant support structure comprising:

an expandable framework having spaced-apart vertical frame components interconnected by upper and lower horizontally telescoping tube pairs, which accommodate a range of interior window frames, said expandable framework being spring biasable against vertical sides of the interior window frame;

a plurality of tray support arms, each of which has a square aperture that rotationally locks to one of said upper and lower horizontally telescoping tube pairs;

a plurality of sleeves which are sized to press into the square apertures of the tray support arms so that some of the arms can be rotationally locked onto a smaller tube of each one of the telescoping tube pairs; and a plurality of plant support trays which are restable on said tray support arms.

4. The potted plant support structure of claim 1, wherein spacing between said plurality of tray support arms is adjustable.

5. The potted plant support structure of claim 1, wherein a smaller tube of each telescoping tube pair slides within a larger tube of the same telescoping tube pair.

6. The potted plant support structure of claim 5, wherein a compressible coil spring is positioned within the larger tube of each telescoping tube pair.

7. The potted plant support structure of claim 6, wherein at least one spacer is also positioned within the larger tube of each telescoping tube pair.

8. The potted plant support structure of claim 6, wherein said compressible coil spring exerts a force against an end of the smaller tube that is inserted into the larger tube when the smaller tube is slid into the larger tube to an extent that the coil spring is compressed.

9. The potted plant support structure of claim 3, wherein at least one of said vertical frame components incorporates a handle, which facilitates installation of the expandable framework within the interior window frame.

10. The potted plant support structure of claim 3, wherein spacing between said plurality of tray support arms is adjustable.

11. The potted plant support structure of claim 3, wherein the smaller tube of each telescoping tube pair slides within a larger tube of the same telescoping tube pair.

12. The potted plant support structure of claim 11, wherein a compressible coil spring is positioned within the larger tube of each telescoping tube pair.

13. The potted plant support structure of claim 12, wherein at least one spacer is also positioned within the larger tube of each telescoping tube pair.

14. The potted plant support structure of claim 12, wherein said compressible coil spring exerts a force against an end of the smaller tube that is inserted into the larger tube when the smaller tube is slid into the larger tube to an extent that the coil spring is compressed.

* * * * *